(12) United States Patent
Khowaiter

(10) Patent No.: US 9,194,611 B2
(45) Date of Patent: Nov. 24, 2015

(54) SELF-BALLASTED, ROOF-INTEGRATED, LIGHTWEIGHT FRC PV MOUNTING SYSTEM

(71) Applicant: Saudi Arabian Oil Company, Dhahran (SA)

(72) Inventor: Ahmad O. Khowaiter, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 114 days.

(21) Appl. No.: 13/860,271

(22) Filed: Apr. 10, 2013

(65) Prior Publication Data

US 2013/0318894 A1    Dec. 5, 2013

Related U.S. Application Data

(60) Provisional application No. 61/655,814, filed on Jun. 5, 2012, provisional application No. 61/655,875, filed on Jun. 5, 2012.

(51) Int. Cl.
| | | |
|---|---|---|
| *E04D 13/18* | (2014.01) | |
| *F24J 2/52* | (2006.01) | |
| *F16M 11/00* | (2006.01) | |
| *H02S 20/24* | (2014.01) | |

(52) U.S. Cl.
CPC .............. *F24J 2/5245* (2013.01); *F16M 11/00* (2013.01); *F24J 2/523* (2013.01); *F24J 2/525* (2013.01); *H02S 20/24* (2014.12); *Y02B 10/12* (2013.01); *Y02B 10/20* (2013.01); *Y02E 10/50* (2013.01)

(58) Field of Classification Search
CPC ........ Y02B 10/12; Y02B 10/20; Y02B 10/50; Y02B 10/52; F24J 2/523; F24J 2/5245; F24J 2/525

USPC .......... 52/173.3; 126/621, 622, 623; 136/251, 136/259; 248/237
See application file for complete search history.

(56) References Cited

U.S. PATENT DOCUMENTS

| 576,831 A | 2/1897 | Accles et al. |
|---|---|---|
| 5,316,592 A | 5/1994 | Dinwoodie |

(Continued)

FOREIGN PATENT DOCUMENTS

| DE | 20312641 U1 | 1/2004 |
|---|---|---|
| DE | 102010008600 A1 | 8/2011 |

(Continued)

OTHER PUBLICATIONS

PCT International Search Report and the Written Opinion of the International Searching Authority dated Dec. 13, 2013; International Application No. PCT/US2012/044189; International File Date: Jun. 5, 2013.

*Primary Examiner* — Jeanette E Chapman
*Assistant Examiner* — James Buckle, Jr.
(74) *Attorney, Agent, or Firm* — Bracewell & Giuliani LLP; Constance Gall Rhebergen

(57) ABSTRACT

A ballast tile system for supporting photovoltaic modules that includes at least one fiber-reinforced concrete ballast tile. The at least one ballast tile has a first mounting member extending upwardly from a top surface thereof, the first mounting member configured to receive a lower end of a photovoltaic module. The at least one ballast tile also has a second mounting member extending upwardly from the top surface thereof, the second mounting member configured to secure an upper edge of the photovoltaic module.

18 Claims, 12 Drawing Sheets

(56) References Cited

U.S. PATENT DOCUMENTS

| | | |
|---|---|---|
| 5,505,788 A | 4/1996 | Dinwoodie |
| 6,046,399 A | 4/2000 | Kapner |
| 6,883,290 B2 | 4/2005 | Dinwoodie |
| RE38,988 E | 2/2006 | Dinwoodie |
| 7,155,870 B2 | 1/2007 | Almy |
| 7,178,295 B2 | 2/2007 | Dinwoodie |
| 7,328,534 B2 | 2/2008 | Dinwoodie |
| 2005/0229924 A1* | 10/2005 | Luconi et al. ............ 126/696 |
| 2011/0108083 A1 | 5/2011 | Ravestein et al. |
| 2012/0031469 A1 | 2/2012 | Loois et al. |
| 2012/0036799 A1 | 2/2012 | Kneip et al. |
| 2012/0102854 A1 | 5/2012 | Meier et al. |
| 2012/0110931 A1 | 5/2012 | Eiffert et al. |
| 2012/0255244 A1 | 10/2012 | Hendrickson et al. |

FOREIGN PATENT DOCUMENTS

| | | |
|---|---|---|
| EP | 1184526 A1 | 3/2002 |
| JP | 11177114 A | 7/1999 |
| JP | 2010258024 A | 11/2010 |
| WO | 03/087493 A1 | 10/2003 |

* cited by examiner

SELF-BALLASTED, ROOF-INTEGRATED, LIGHTWEIGHT FRC PV MOUNTING SYSTEM

CROSS REFERENCE TO RELATED APPLICATIONS

This application claims priority to and the benefit of U.S. Provisional Application Ser. Nos. 61/655,814 and 61/655,875, both of which were filed Jun. 5, 2012, the full disclosures of which are hereby incorporated herein by reference.

BACKGROUND OF THE INVENTION

1. Field of the Invention

The present technology relates to mountings for photovoltaic modules. More specifically, the technology relates to a self-ballasted, roof-integrated, lightweight fiber reinforced concrete system and method for mounting photovoltaic modules.

2. Description of the Related Art

Solar power is as an important alternative energy source. Solar photovoltaic (PV) technology is an approach for large scale solar energy collection. PV technology has demonstrated to be an economically and technologically feasible approach to supplying sustainable energy in buildings. Solar photovoltaic systems utilize solar modules to convert sunlight into electricity. The PV module conventionally consists of a PV laminate generally forming an assembly of crystalline or amorphous semiconductor devices electrically interconnected and encapsulated. One or more electrical conductors are carried by the PV laminate through which the solar-generated current is conducted.

Most PV applications include placing an array of PV modules at the installation site in a location where sunlight is readily present. Many commercial or residential buildings have large, flat roofs that are conducive to placement of a PV module array. While rooftop installation is highly viable, certain limitations must be addressed.

Many conventional mounted solar arrays are designed to take advantage of the optimum latitude angle and optimum pitch angle, thereby maximizing utilization of average annual solar insulation. Many conventional "adjustable" array are designed to allow the pitch angle of the array to be altered, thereby accommodating a shallower angle during the summer months, taking advantage of the period when the sun appears high in the sky and a steeper angle during the winter months when the sun appears lower in the sky. However, the adjustable mounted array is generally more expensive than fixed units (i.e units that are physically interconnecting) that are suitable in lower altitude countries.

Conventional PV module array installation techniques have included physically interconnecting each individual PV module of the array directly with, or into, the existing rooftop structure. For example, some PV module configurations have included multiple frame members that are physically attached to the rooftop via bolts penetrating the rooftop. While this technique can provide a more rigid attachment of the PV module, it is a time-consuming process and permanently damages the rooftop. Also, because holes are formed into the rooftop, water damage can arise. It is often a requirement that solar module arrays and other such auxiliary objects be free standing on the roof and not be physically attached to the roof. However, because PV modules are large flat structures, gusts of wind acting under a PV module can create lifting forces large enough to displace the PV module. PV modules can be weighted to increase wind resistance, however, roofs have weight load limitations. Therefore PV module arrays must be relatively lightweight.

SUMMARY OF THE INVENTION

Applicant has recognized a need for a system and method for mounting PV modules that can be installed without physically or mechanically attaching the module-mounting structure to the building roof and which can be installed with little time and labor. A need also exists for a mounting system that can be manufactured easily and inexpensively. These needs are met by the present technology as described and claimed below.

In one embodiment of the present technology, a ballast tile apparatus for supporting photovoltaic modules includes a precast concrete ballast tile. The ballast tile has at least one lower mounting member extending upwardly from a top surface of the ballast tile. Each lower mounting member has a horizontal slot formed therein for receiving a lower end of a photovoltaic module. The horizontal slot is located at a first elevation on each lower mounting member measured from the top surface of the ballast tile. The ballast tile also has at least one upper mounting member extending upwardly from the top surface of the ballast tile. Each upper mounting member includes a connector means for securing an upper edge of the photovoltaic module. The connector means is located at a second elevation on the upper mounting member measured from the top surface of the ballast tile and the second elevation is at least as high as the first elevation. A strut member is positioned between each lower mounting member and a corresponding upper mounting member.

In certain embodiments of the current technology, the lower mounting member and upper mounting member are formed of fiber reinforced concrete. The fiber reinforced concrete can be, for example, alkaline-resistant glass and polymer fiber. In alternative embodiments, the height of the first elevation and the height of the second elevation are at least about 100 mm. The connector means can be a bolt or threaded clamp with adjustable opening.

In yet other embodiments of the current technology, the upper mounting members and lower mounting members can position the photovoltaic module substantially horizontal. Alternatively, the upper mounting members and lower mounting members can position the photovoltaic module at a low incidence angle relative to a horizontal plane to ease the cleaning the of PV module. The strut member can include at least one opening for the passage of a cable.

Alternative embodiments of the current technology can include a system of ballast tiles supporting photovoltaic modules integrated with a building roof The system includes a plurality of photovoltaic modules. At least one cable is operably connected between each of the plurality of photovoltaic modules. The system also includes a plurality of precast concrete ballast tiles. Each ballast tile has at least one lower mounting member extending upwardly from a top surface of the ballast tile. Each lower mounting member has a horizontal slot formed therein for receiving a lower end of a photovoltaic module. The horizontal slot is located at a first elevation on each lower mounting member measured from the top surface of the ballast tile. The system further includes at least one upper mounting member extending upwardly from the top surface of the ballast tile. Each upper mounting member has a connector means for securing an upper edge of the photovoltaic module. The connector means is located at a second elevation on the upper mounting member measured from the top surface of the ballast tile and the second elevation is at least as high as the first elevation. A strut member is positioned between each lower mounting member and a corresponding upper mounting member.

In certain embodiments, the photovoltaic module includes a photovoltaic laminate. In other embodiments, the photovoltaic module includes an aluminum frame. The connector means can include a fitting means to fasten the photovoltaic modules in place. In alternative embodiments, the photovoltaic module has a width of approximately about 800 mm or a width in the range of about 970 mm to about 1000 mm. The building roof can be a flat roof and can be positioned in lower latitude region.

In yet other embodiments of the current technology, a method of non-penetrating installation of photovoltaic modules on a building roof includes the steps of providing a plurality of photovoltaic modules and a plurality of precast concrete ballast tiles. Each ballast tile includes two lower mounting member extending upwardly from a top surface of the ballast tile. Each lower mounting member has a horizontal slot formed therein for receiving a lower end of a photovoltaic module. The horizontal slot is located at a first elevation on each lower mounting member measured from the top surface of the ballast tile. The ballast tile further includes two upper mounting member extending upwardly from the top surface of the ballast tile. Each upper mounting member has a connector means for securing an upper edge of the photovoltaic module. The connector means is located at a second elevation on the upper mounting member measured from the top surface of the ballast tile and the second elevation is at least as high as the first elevation. A strut member is positioned between each lower mounting member and a corresponding upper mounting member. A lower edge of each photovoltaic module is placed within the slot of the lower mounting members of a concrete ballast tile and the upper edge of each photovoltaic module is lowered onto the upper mounting members of such concrete ballast tile. The upper edge of the photovoltaic module is secured to the upper mounting member with the connector means. The photovoltaic modules are operably connected with a cable.

In alternative embodiments, the photovoltaic module includes an aluminum frame, the connector means includes a steel clamp and twist type lockdown nut, and the step of securing the upper edge of the photovoltaic module to the upper mounting members with the connector means includes clamping the photovoltaic module to the upper mounting members. In other alternative embodiments, each strut member has at least one opening for the passage of a cable and the step of operably connecting the photovoltaic modules with a cable includes connecting adjacent photovoltaic modules in series by positioning the cables under the photovoltaic modules. Alternatively, the cable can include a string cable and the step of operably connecting the photovoltaic modules includes connecting the photovoltaic with the string cable positioned under the photovoltaic modules.

In still other embodiments the step of securing the upper edge of the photovoltaic module to the upper mounting members with the connector means includes positioning the photovoltaic module at a low incidence angle relative to a horizontal plane to ease the cleaning the of PV module. The building roof can be a flat roof and can be located in a lower latitude region and the step of providing a plurality of ballast tiles can further include positioning the ballast tiles on the roof. The ballast tiles can be positioned directly adjacent to each other on the building roof.

In addition to the above, alternate embodiments of the present technology are provided. For example, one embodiment of the present technology provides a ballast tile system for supporting photovoltaic modules having at least one fiber-reinforced concrete ballast tile. The at least one ballast tile includes a first mounting member extending upwardly from a top surface of the at least one ballast tile, the first mounting member configured to receive a lower end of a photovoltaic module. In addition, the ballast tile can include a second mounting member extending upwardly from the top surface of the at least one ballast tile, the second mounting member configured to secure an upper edge of the photovoltaic module. In some embodiments, the first and second mounting members are integral to the at least one fiber-reinforced concrete ballast tile.

The first mounting member can have a horizontal slot arranged to receive the lower end of the photovoltaic module, the horizontal slot is located at a first elevation on the first mounting member measured from the top surface of the at least one ballast tile. Furthermore, the second mounting member secures the upper edge of the photovoltaic module with a connector located at a second elevation on the upper mounting member measured from the top surface of the at least one ballast tile. The second elevation can be at least as high as the first elevation. The height of the first elevation and the height of the second elevation can be at least about 100 mm.

In certain embodiments, the fiber reinforced concrete can be selected from a group consisting of alkaline-resistant glass and polymer fiber. In addition, the second mounting member can be secured to the upper edge of the photovoltaic module using a connector selected from a group consisting of a bolt, and a threaded clamp with an adjustable opening. The first and second mounting members can operable to position the photovoltaic module substantially horizontal. Alternately, the first and second mounting members are operable to position the photovoltaic module at a low incidence angle relative to a horizontal plane to ease the cleaning the of PV module. In embodiments where the at least one ballast tile is a plurality of ballast tiles, spacer tiles can be positioned between the plurality of ballast tiles.

Another embodiment of the present technology provides a system of ballast tiles for supporting photovoltaic modules integrated with a building roof. The system includes a photovoltaic module, a first fiber-reinforced concrete ballast tile including a first mounting member extending upwardly from a top surface thereof, the first mounting member configured to receive a lower end of the photovoltaic module, and a second fiber-reinforced concrete ballast tile including a second mounting member extending upwardly from the top surface thereof, the second mounting member configured to secure an upper edge of the photovoltaic module. The first and second mounting members can be integral to the first and second fiber-reinforced concrete ballast tiles, respectively.

In some embodiments, the first mounting member can have a horizontal slot arranged to receive the lower end of the photovoltaic module, and the horizontal slot can located at a first elevation on the first mounting member measured from the top surface of the at least one ballast tile, In addition, the second mounting member can secure the upper edge of the photovoltaic module with a connector located at a second elevation on the upper mounting member measured from the top surface of the at least one ballast tile. The second elevation can be at least as high as the first elevation, and the height of the first elevation and the height of the second elevation can be at least about 100 mm.

In certain embodiments, the photovoltaic module can an aluminum frame. In addition, the photovoltaic module can have a width of approximately about 800 mm. Alternatively, the photovoltaic module can have a width in the range of about 970 mm to about 1000 mm. The building roof on which the photovoltaic modules are mounted is flat roof Yet another embodiment of the present technology provides a ballast tile system for supporting photovoltaic modules, a photovoltaic module, and at least one fiber-reinforced concrete ballast tile. The ballast tile can include a first mounting member integral to and extending upwardly from a top surface of the at least one ballast tile, the first mounting member having a horizontal slot arranged to receive the lower end of the photovoltaic module, and the horizontal slot is located at a first elevation on the first mounting member measured from the top surface of the at least one ballast tile. In addition, the ballast tile can include a second mounting member integral to and extending upwardly from the top surface of the at least one ballast tile, the second mounting member securing the upper edge of the photovoltaic module with a connector located at a second elevation on the upper mounting member measured from the top surface of the at least one ballast tile, wherein the second elevation is at least as high as the first elevation.

BRIEF DESCRIPTION OF THE DRAWINGS

So that the manner in which the above-recited features, aspects and advantages of the technology, as well as others that will become apparent, are attained and can be understood in detail, a more particular description of the technology briefly summarized above can be had by reference to the embodiments thereof that are illustrated in the drawings that form a part of this specification. It is to be noted, however, that the appended drawings illustrate only preferred embodiments of the technology and are, therefore, not to be considered limiting of the technology's scope, for the technology can admit to other equally effective embodiments. In the several figures, like components are identified by like numerals.

DETAILED DESCRIPTION OF THE EXEMPLARY EMBODIMENTS

Figure 1:
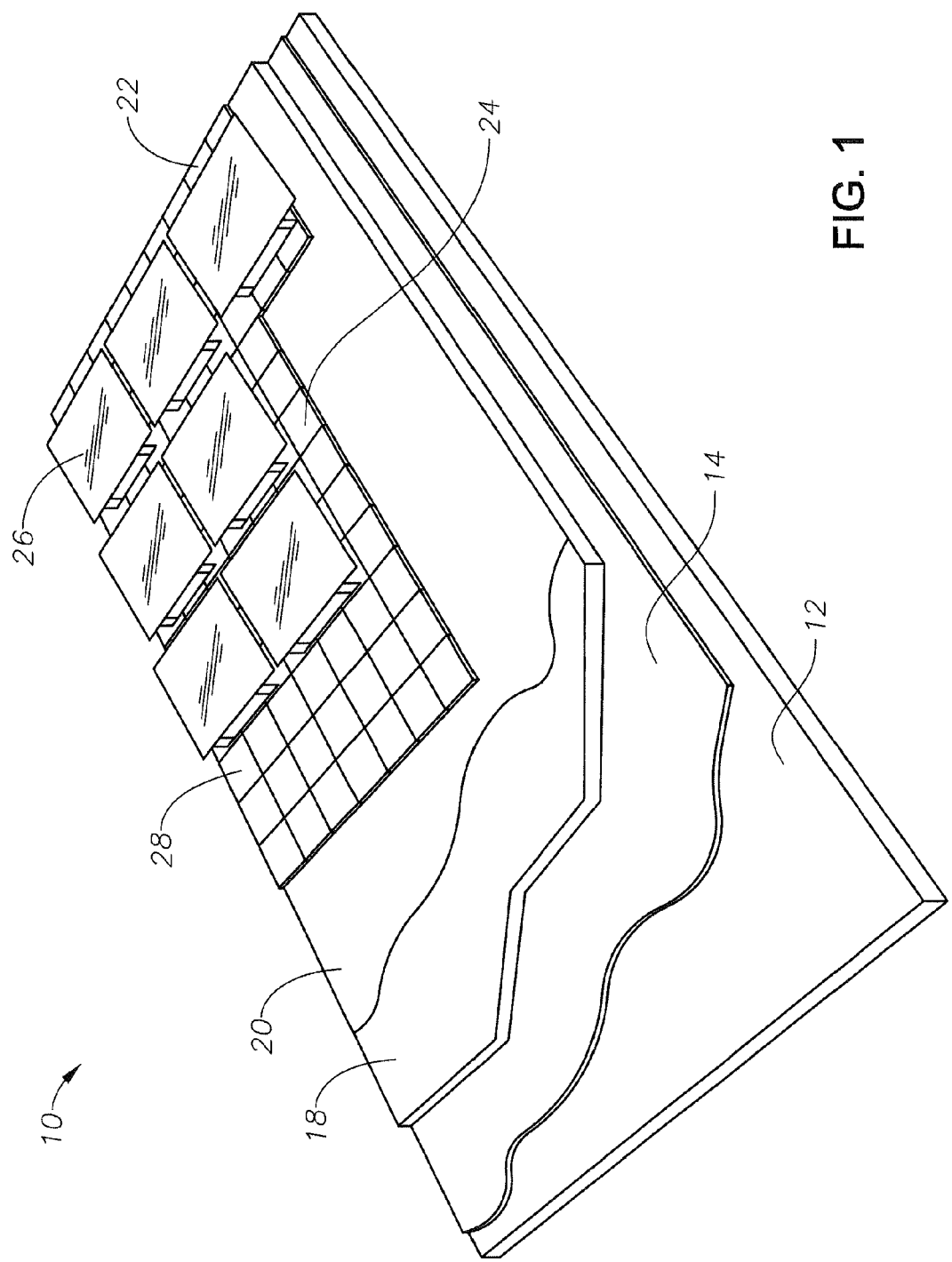
FIG. 1 is a perspective view of an installation according to an embodiment of the present technology.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the technology is not intended to be limited to the specific terms used, and it is to be understood that each specific term includes equivalents that operate in a similar manner to accomplish a similar purpose.

Figure 2:
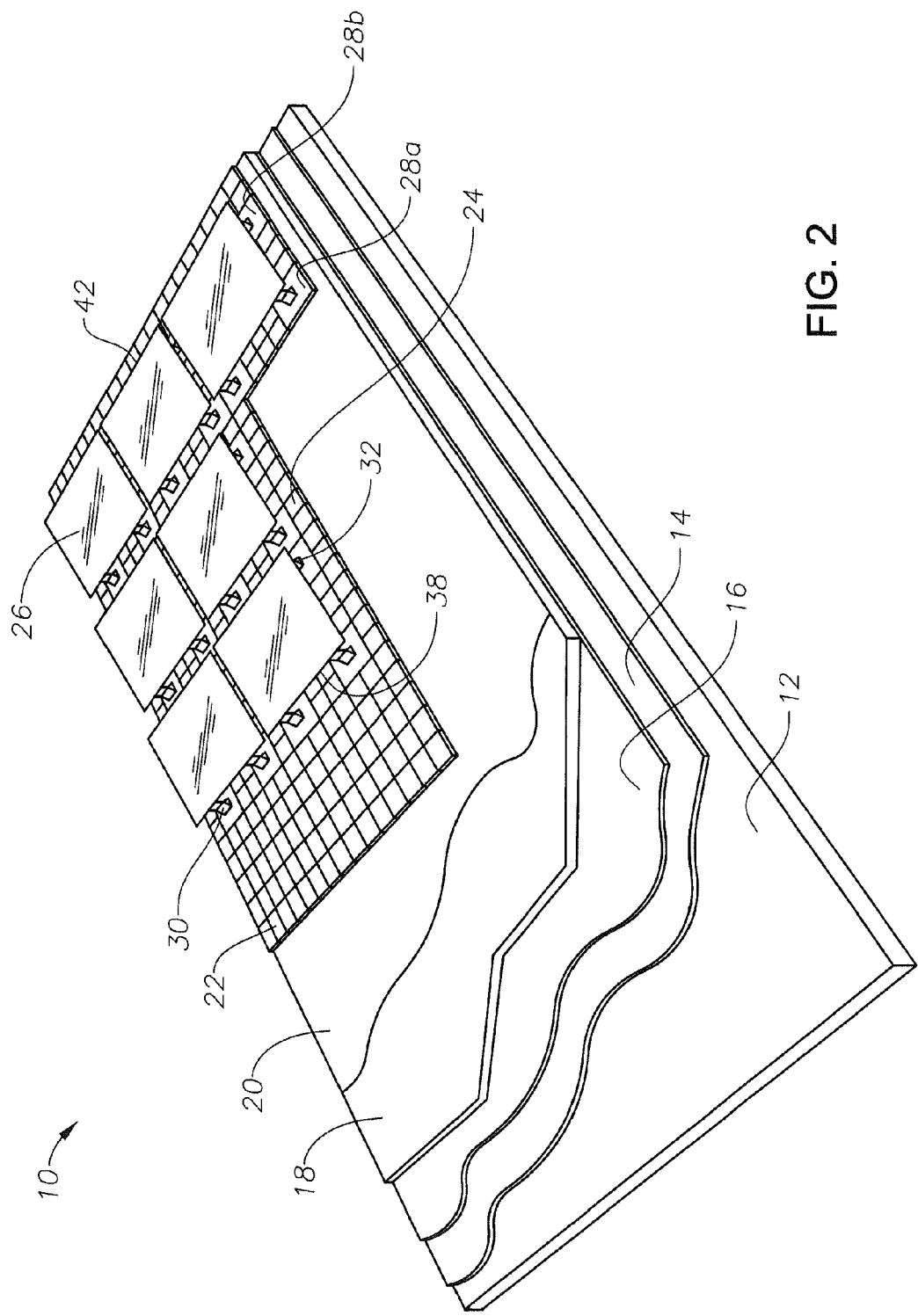
FIG. 2 is a perspective view of an alternate embodiment of an installation according to an embodiment of the present technology.
Figure 3:
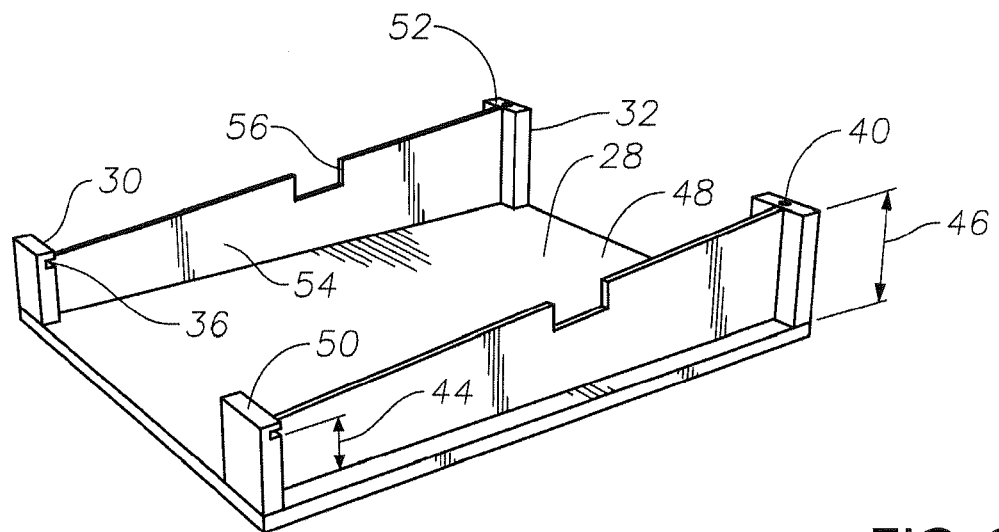
FIG. 3 is perspective view of a FRC self-ballasted PV mounting tile with mounting members according to the embodiment of FIG. 1.
Figure 4:
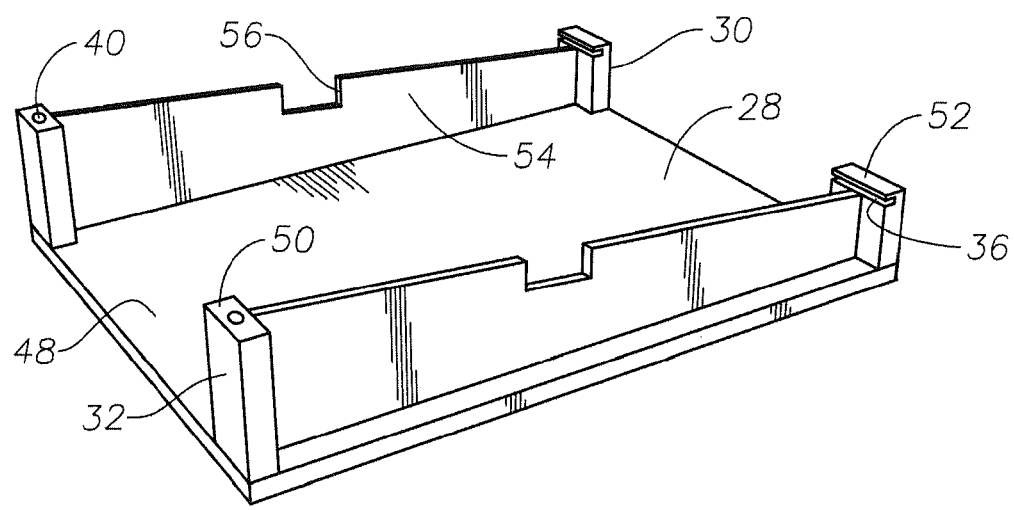
FIG. 4 is another perspective view of a FRC self-ballasted PV mounting tile with mounting members according to the embodiment of FIG. 1.
Figure 5:
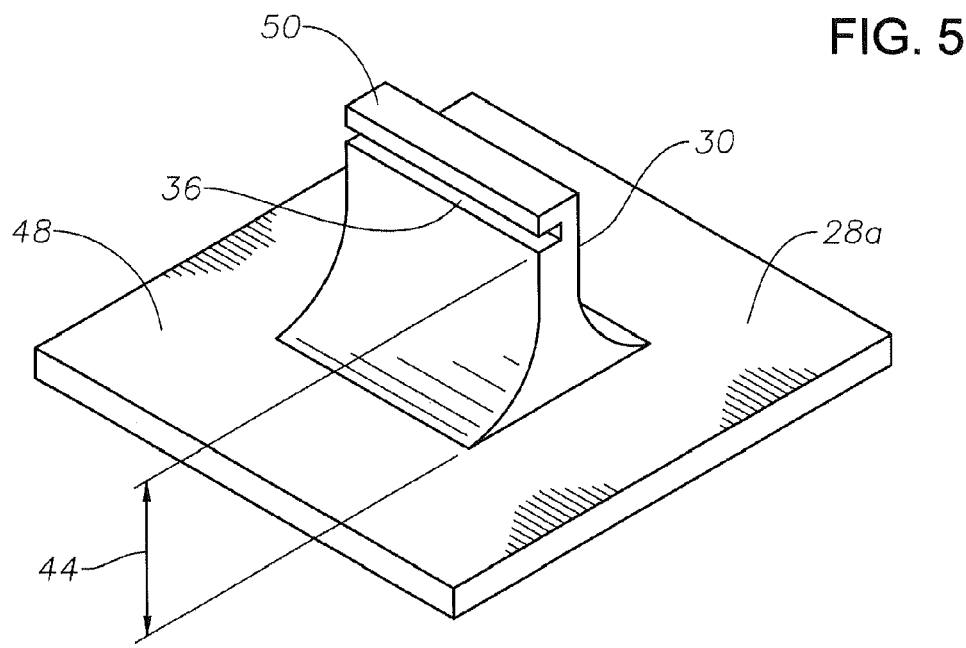
FIG. 5 is a perspective view of a FRC self-ballasted PC mounting tile with a lower mounting member according to the embodiment of FIG. 2.
Figure 6:
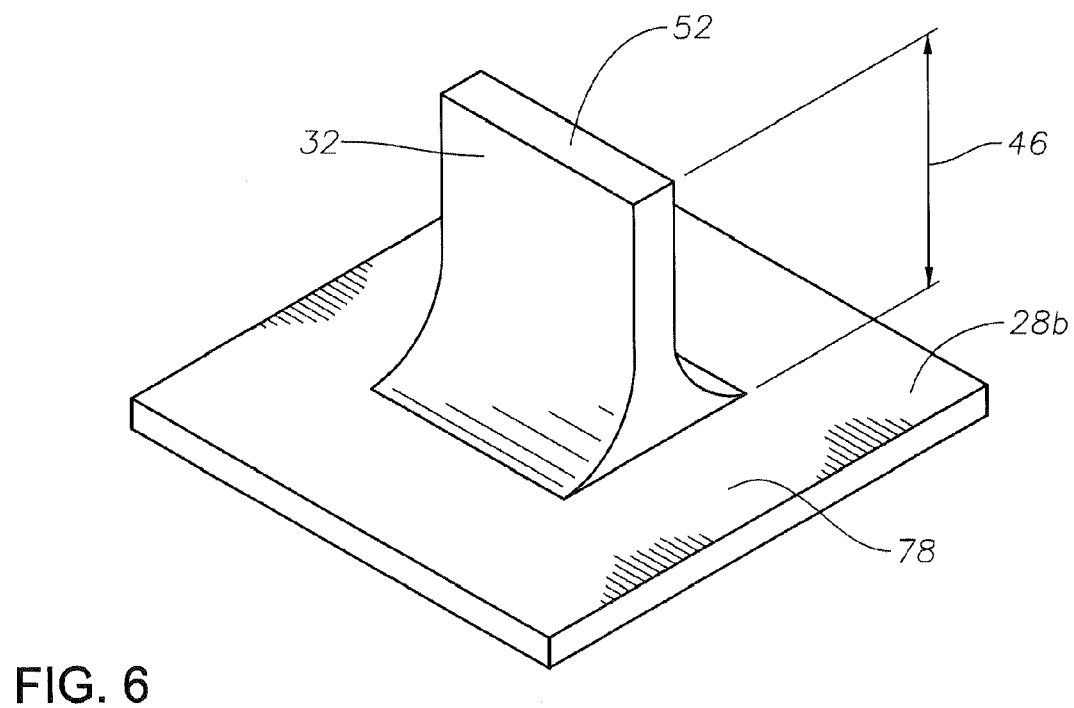
FIG. 6 is a perspective view of a FRC self-ballasted mounting tile with an upper mounting member according to the embodiment of FIG. 2.

As can be seen in the embodiments shown in FIGS. 1 and 2, a typical insulated inverted roofing system, or protected membrane roof 10, can include multiple layers installed over a roof slab 12. Insulated inverted roofing systems or protected membrane roofs have become the standard in the design of modern flat roofs typically used in the construction of commercial buildings and homes, especially in lower latitude regions. In some embodiments, the roof slab 12 can be covered with a layer of concrete foam 14 followed by a two-layer insulation membrane 16 (shown in FIG. 2). However, in some embodiments, such as that shown in FIG. 1, the two-layer insulation membrane can also be absent. Weather proofing layer 18 above roof slab 10 can include, for example, a polymer membrane or bitumen. Weatherproofing layer 18 is followed by a thermal insulating layer 20, such as, for example, polystyrene sheets. These layers are topped by a ballast layer 22, which can typically consist of heavy concrete paver tiles 24, such as, for example, precast concrete tiles. Exemplary concrete paver tiles 24 can range in thickness from about 20 mm to about 50 mm and have various square lengths.

In embodiments of the current technology, solar photovoltaic (PV) modules 26 are supported on roof 10 with a ballast tile system. In one embodiment, shown in FIG. 1, the ballast tile system includes precast concrete ballast tiles 28, which are integrated with the ballast layer 22. Turning to FIGS. 3, 4, 8, and 9, each ballast tile 28 includes lower mounting members 30 and upper mounting members 32. Both lower and upper mounting members 30, 32 extend upwardly from a top surface 34 of the ballast tile 28 away from building roof 10. Upper and lower mounting members 30, 32 can be positioned on the ballast tiles 28 in such a way that they support the PV modules 26 at or near corners of the PV modules 26, leaving open the areas on the sides of the PV modules 26 between the PV modules 26 and the ballast tiles 28.

The embodiment shown in FIG. 2 is similar to that shown in FIG. 1. One difference between the embodiments, however, is that in the embodiment of FIG. 2, the ballast tile system includes separate ballast tiles 28a, 28b to support the lower and upper mounting members 30, 32, respectively.

In both of the embodiments shown in FIGS. 1 and 2, and as best shown in FIGS. 3-6, lower mounting member 30 has a horizontal slot 36 with an open end that faces towards an upper mounting member 32 when positioned for use. Slot 36 can be sized to receive a lower edge 38 of a PV module 26 (see FIGS. 8-13). Upper mounting member 32 supports a connector means 40, such as a bolt or threaded clamp with adjustable opening, which provides a means for quick clamping of an upper edge 42 of the PV module 26 to the upper mounting member 32 to ensure a quick and easy connection of the PV module 26.

Horizontal slot 36 is located at a first elevation 44 on lower mounting member 30. Connector means 40 is located at a second elevation 46 on upper mounting member 32. The first elevation 44 of slot 36 relative to a top surface 48 of ballast tile 28, 28a can be equal to or less than (i.e. lower than) the second elevation 46 of connector means 40 relative to a top surface 48 of ballast tile 28, 28b. When the first elevation 44 is equal to the second elevation 46, the PV module can be installed in a horizontal position. When the first elevation 44 is less than the second elevation 46, the PV module can be installed in a position with an incidence angle relative to a horizontal plane. As shown, for example, in FIGS. 3, 4, and 8, slot 36 can be located below a top end 50 of lower mounting member 30 and connector means 40 can be located at a top end 52 of upper mounting member 32. In alternative embodiments, the elevation of top end 50 of lower mounting member 30 relative to the top surface 48 of ballast tiles 28, 28a can be less than (i.e. lower than) the elevation of top end 52 of upper mounting member 32 relative to top surface 48 of ballast tile 28, 28b.

In some embodiments, such as that shown in FIGS. 3, 4, 8, and 9, the ballast tiles 28 can also include strut members 54. Strut members 54 are positioned between each lower mounting member 30 and a corresponding upper mounting member 32. Strut members 54 provide structural support for the lower and upper mounting members 30, 32. Strut members 54 can have an opening 56 for the passage of cables 58 (shown in FIG. 10). Strut members 54 can be formed of a single plane of material or, alternately, can take on alternate forms as would be understood by those with skill in the art.

In each of the disclosed embodiments, ballast tiles 28, 28a, 28b can be designed with mounting members 30, 32 at varied heights to accommodate the necessary mounting angles of PV module 26 as needed to maximize economic value depending on geographic location and seasonal variation in cost of electricity. In one embodiment, the minimum height of mounting members is, for example, at least about 100 mm to ensure adequate airflow underneath the PV modules 26 for cooling of the PV modules 26, and to prevent particles, such as sand or debris, from becoming trapped beneath the PV modules 26. Mounting members 30, 32 can be precast with ballast tiles 28, 28a, 28b or can be otherwise secured to or supported by ballast tiles 28, 28a, 28b.

Prior art structural supports for PV modules 26 are typically made of steel or aluminum which has the requisite tensile strength to withstand transverse stresses due mainly to wind loading. In regions where peak power costs are higher in summer, it is economically advantageous to maintain a nearly horizontal layout in order to maximize energy from the summer sun, as opposed to the typical latitude angle which maximizes energy yield year round. A nearly horizontal installation angle reduces transverse wind loading significantly, thus reducing tensile stresses in the supports. Concrete has a high compressive strength, and is normally not used in tensile applications unless it is reinforced with steel "rebar". However, the resulting reinforced concrete is heavy, not conducive to mass production, and not cost effective.

In embodiments of the present technology, mounting members 30, 32 are provided with the necessary structural properties through the use of fiber, for example, alkaline-resistant (AR) glass, or polymer, to create fiber reinforced concrete (FRC). The desired weight of tiles 28, 28a, 28b with mounting members 30, 32 can be achieved through the use of light weight concrete mixtures, such as, for example, foam filled or aerated, mixtures, as needed to allow manual installation, and maintain design roof loading. These materials can add to the unique energy conversion advantages of embodiments of the current technology for regions of low latitude to harvest solar energy which do not provide the same energy conversion in higher latitude. The use of reinforcing fibers in the concrete allows the elimination of steel rebar. By eliminating the rebar, it can be possible to use mass production techniques to manufacture the ballast tiles 28, 28a, 28b in molds.

Ballast tiles 28, 28a, 28b are installed in the same manner as the conventional precast concrete tiles 24 they replace in new buildings, incurring no additional labor costs, and minimal incremental material costs. Ballast tiles 28, 28a, 28b represent a dual use of building materials with mounting hardware. This eliminates the net cost of PV mounting structures, thus reducing the cost of the mounting system substantially.

Conventional tiles 24 can be, for example, about 200 mm squared, and can be used to ensure spacing requirements between ballast tiles 28, 28a, 28b. Conventional spacing tiles 24 also ensure flexibility to accommodate varied widths and lengths of various manufacturers' PV modules 26. The width of PV modules 26 normally varies in about 200 mm increments, which can be equal to one conventional spacing tile 24 length. In one example, one embodiment of the present technology can accommodate about a 1200 mm×1000 mm PV module 26 by using conventional spacing tiles 24 with a length and width of about 200 mm.

Figure 7:
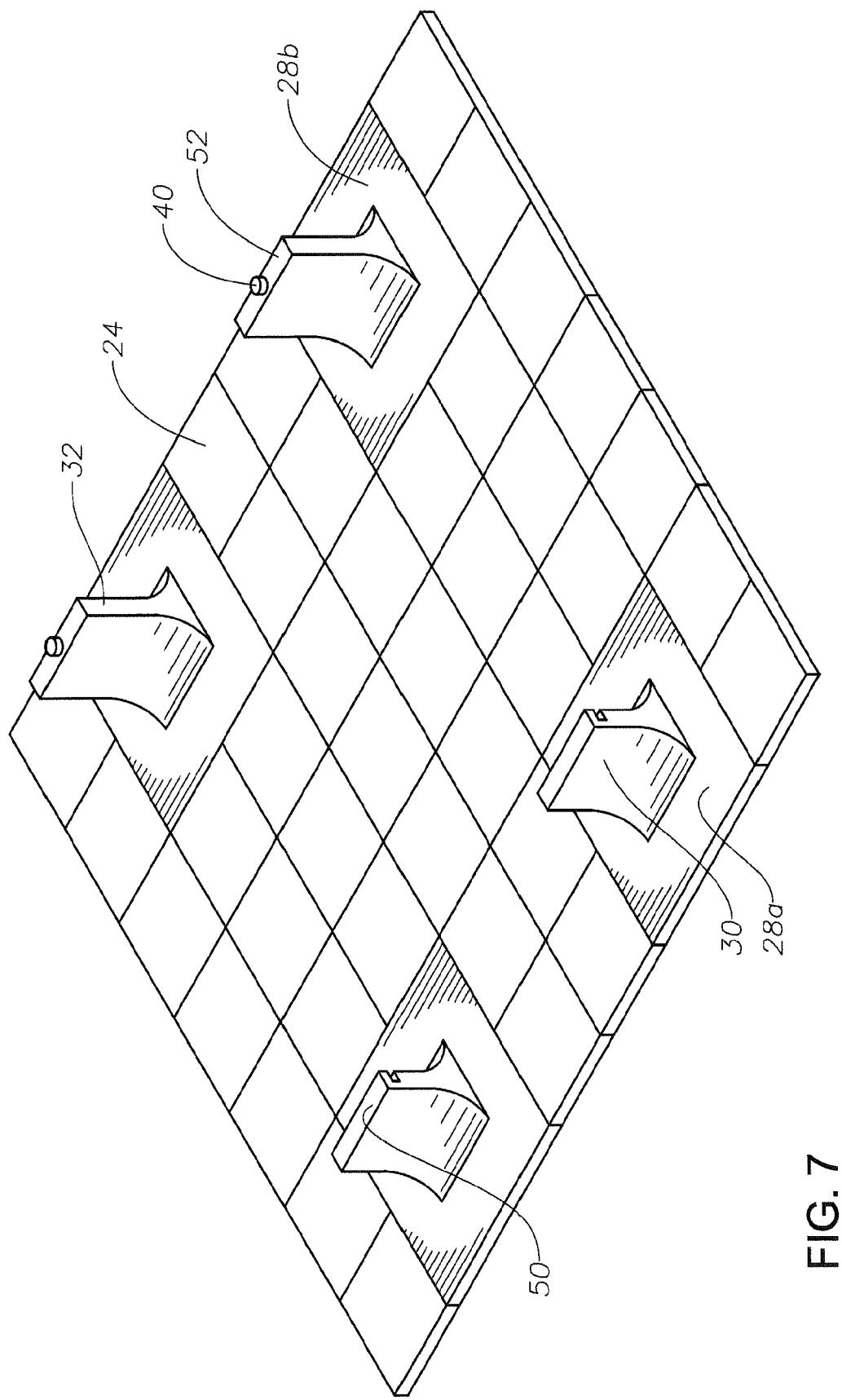
FIG. 7 is a perspective view of a PV ballast tiles installed with conventional tiles as spacers according to the embodiment of FIG. 2.
Figure 8:
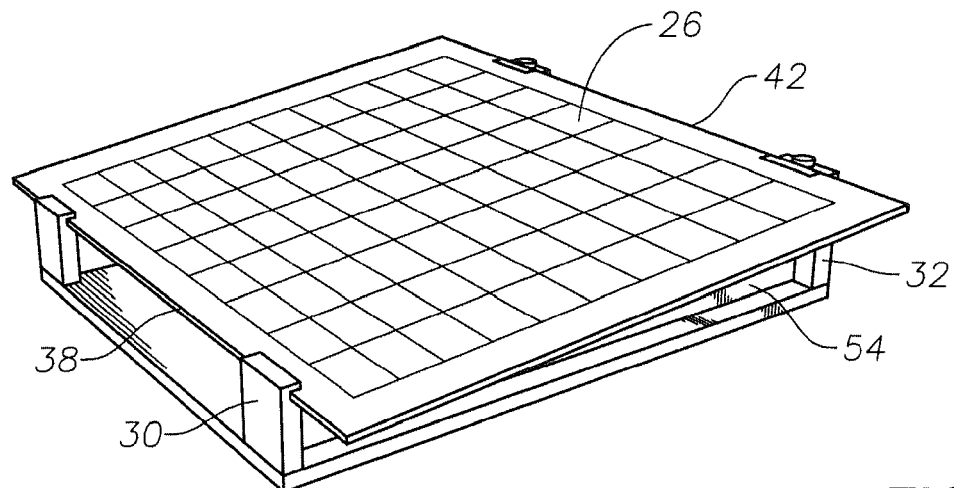
FIG. 8 is a perspective view of a glass laminate type PV module installed on mounting members according to the embodiment of FIG. 1.
Figure 9:
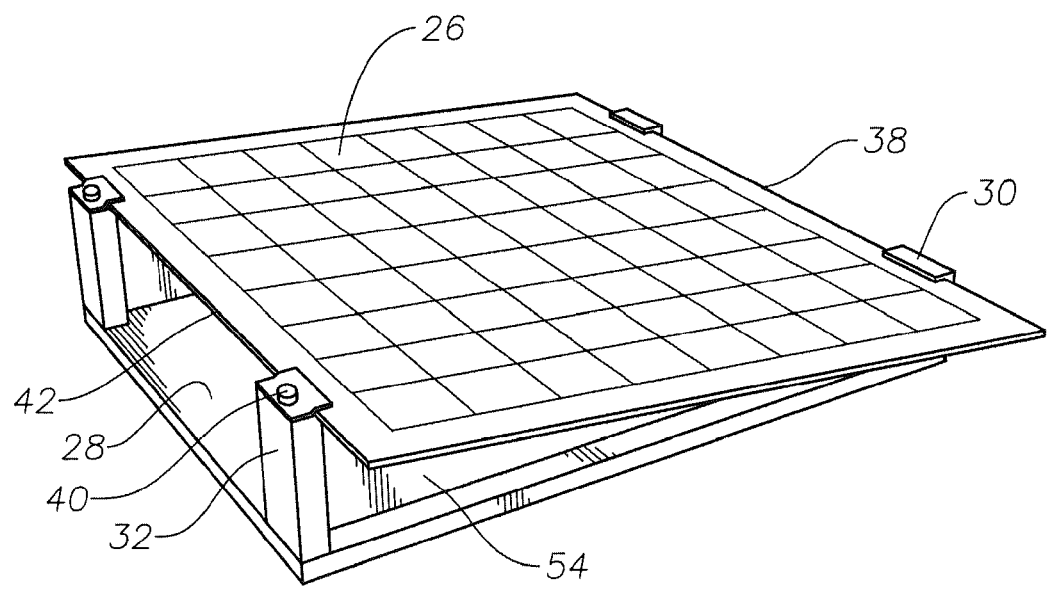
FIG. 9 is another perspective view of a glass laminate type PV module installed on mounting members according to the embodiment of FIG.1.
Figure 10:
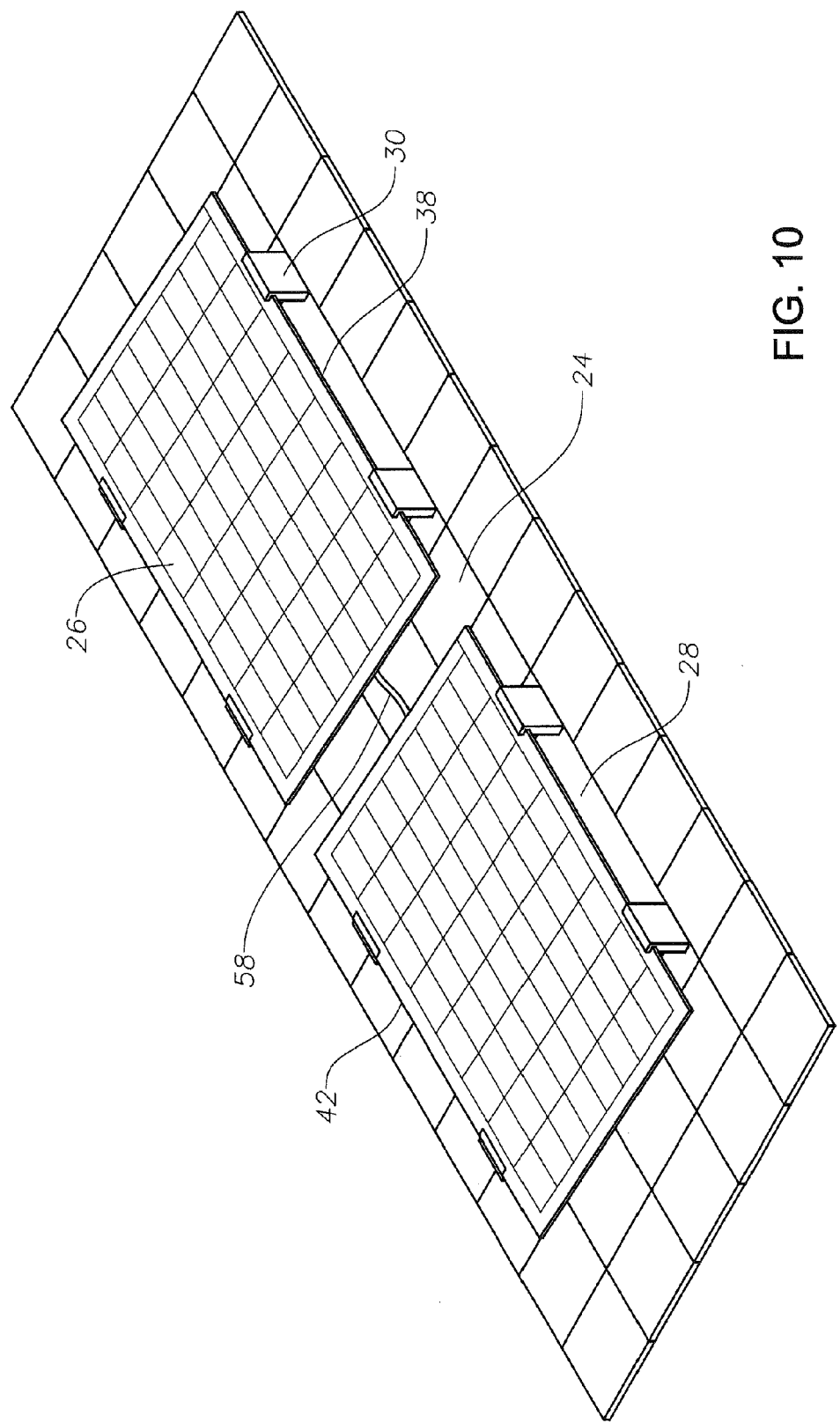
FIG. 10 is a perspective view of multiple PV modules installed on mounting members according to the embodiment of FIG. 1.
Figure 11:
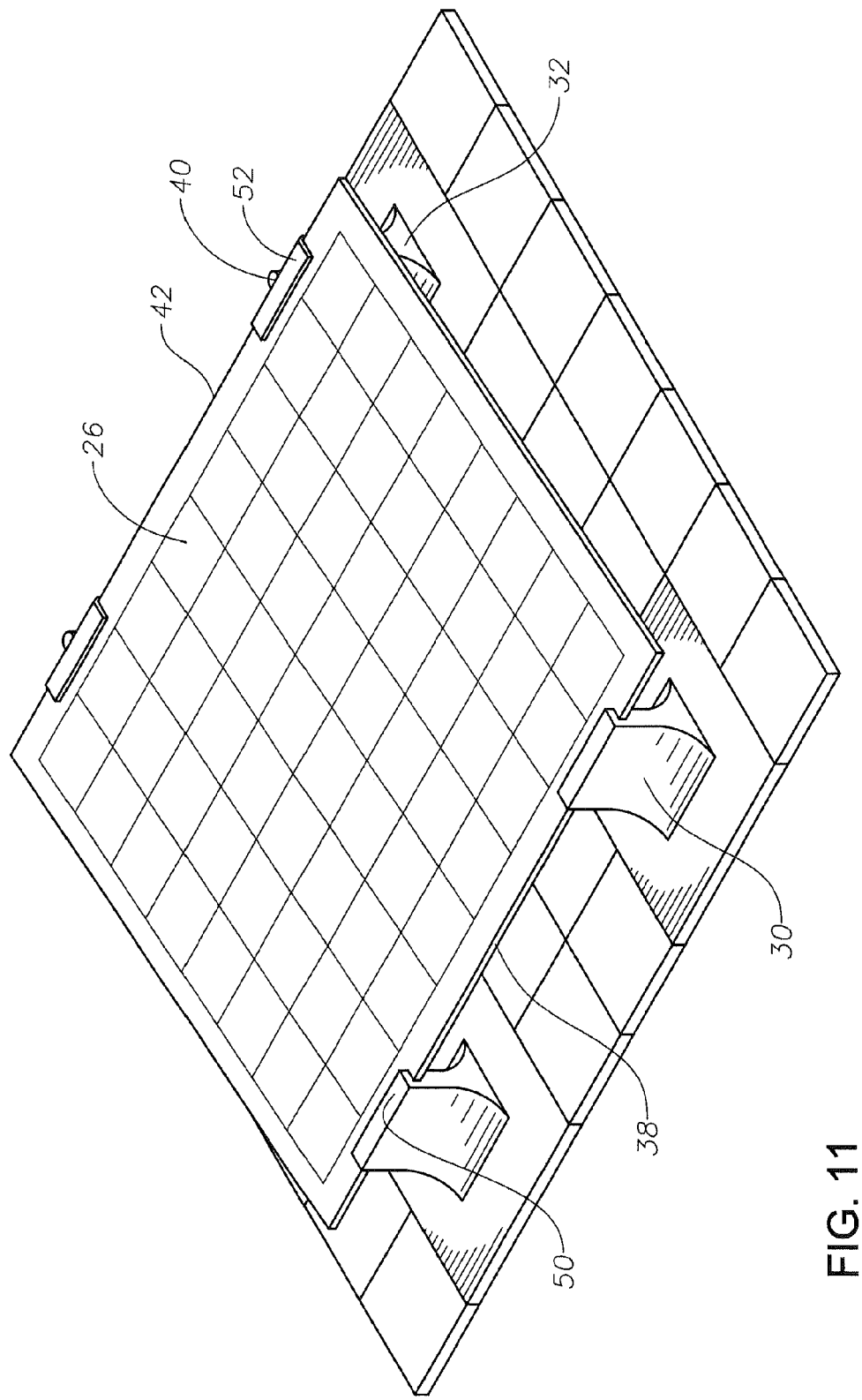
FIG. 11 is a perspective view of a glass laminate type PV module installed on mounting members according to the embodiment of FIG. 2.
Figure 12:
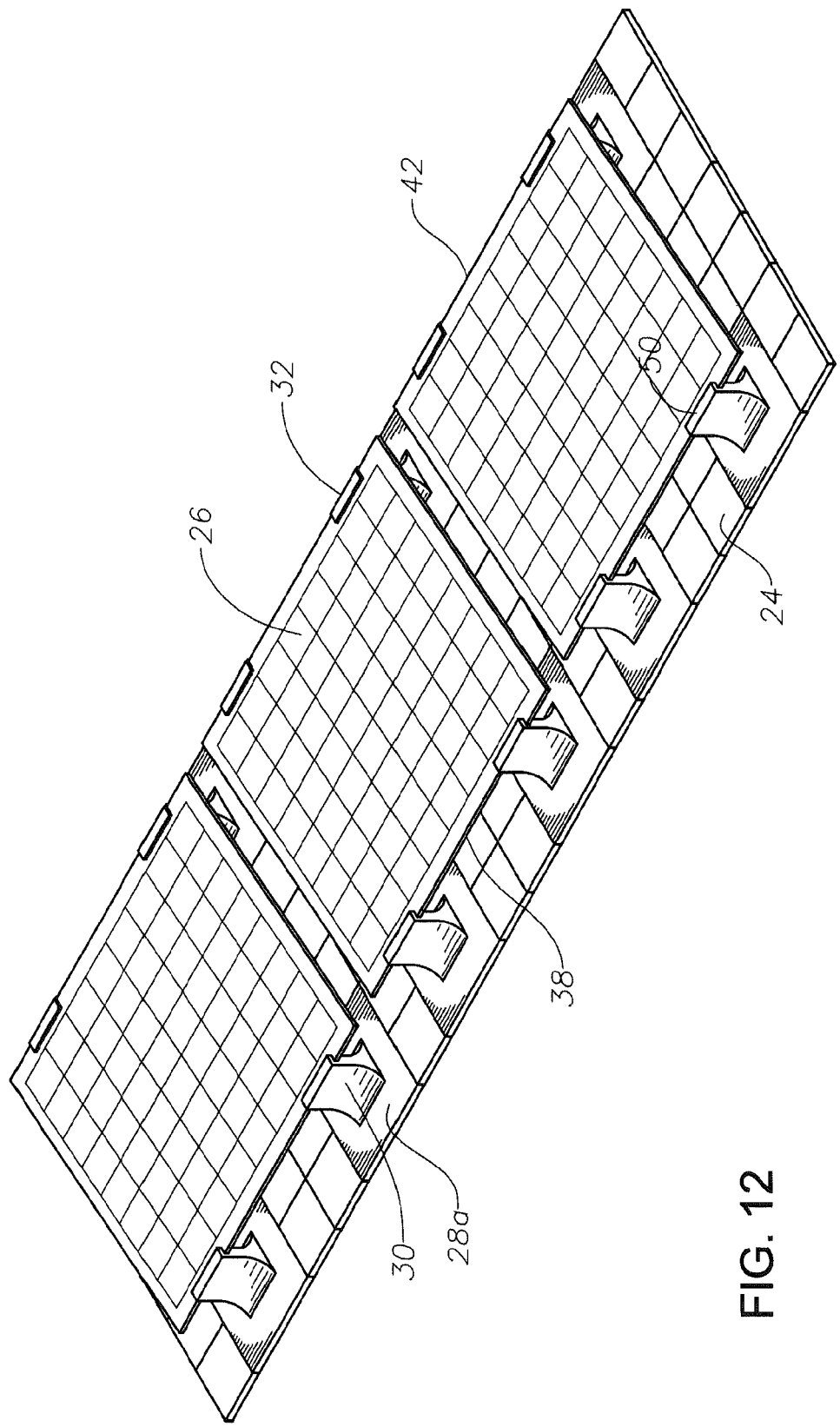
FIG. 12 is a perspective view of PV ballast tiles installed with conventional tiles as spacers according to the embodiment of FIG. 2.
Figure 13:
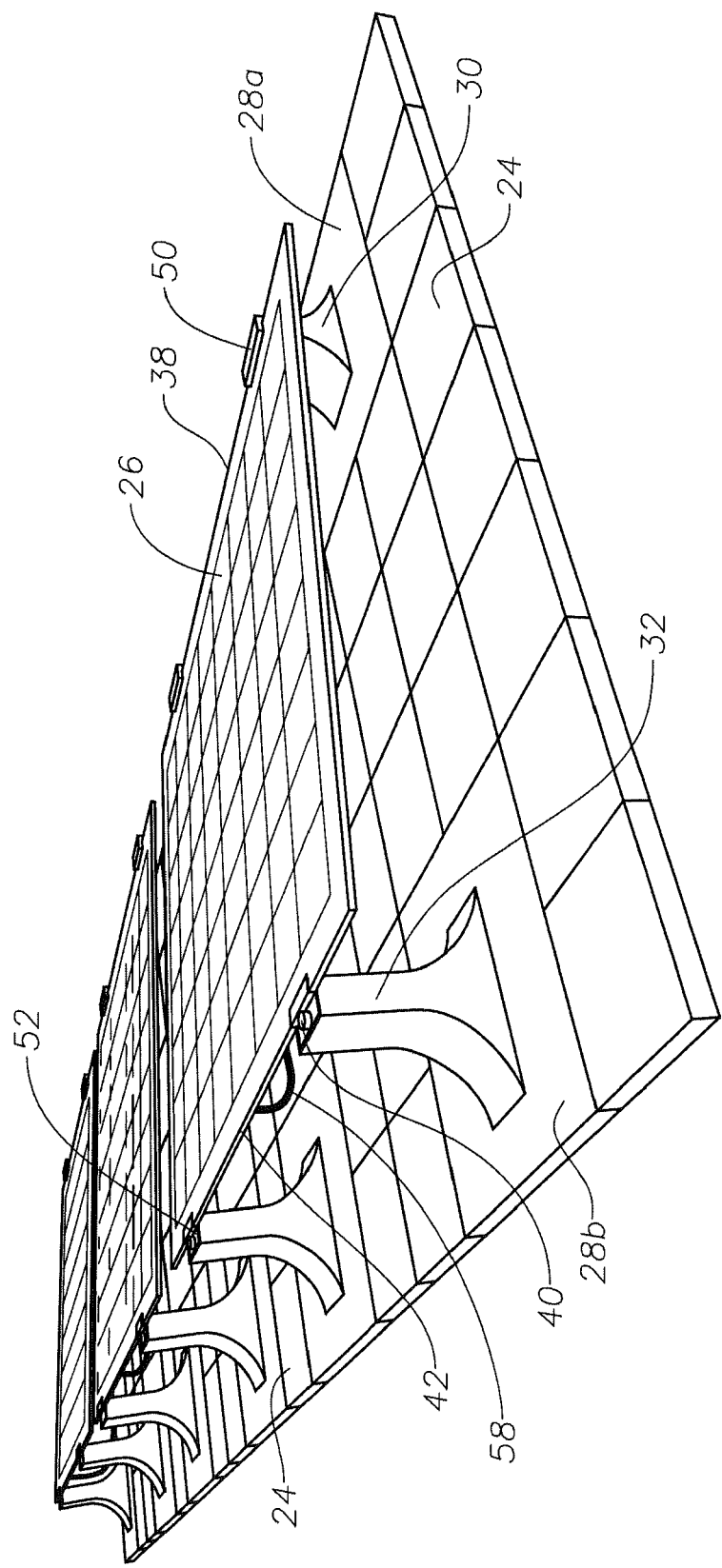
FIG. 13 is a perspective view of multiple PV modules installed on mounting members according to the embodiment of FIG. 2.
Figure 14:
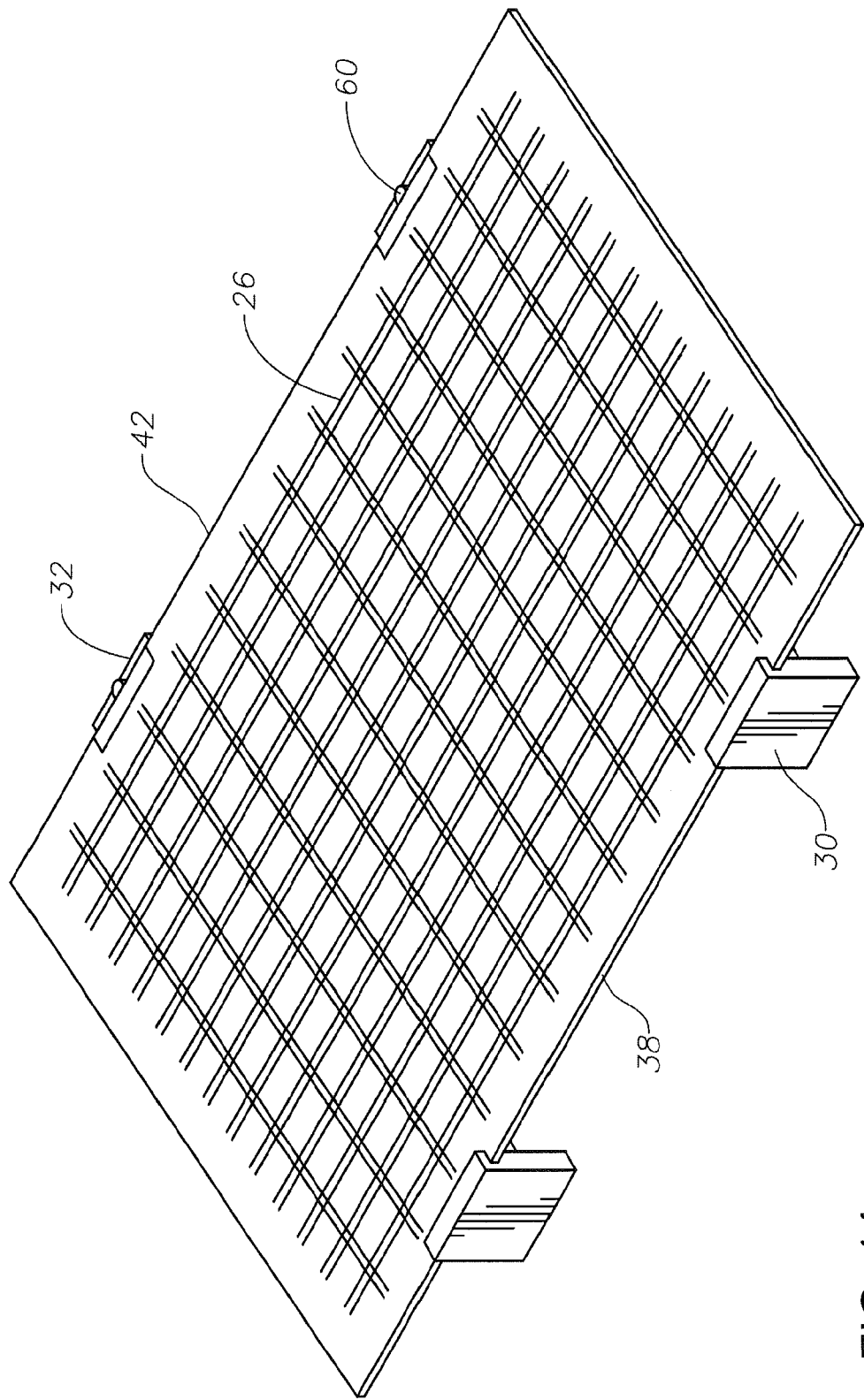
FIG. 14 is a perspective view of a framed PV module installed on mounting members according to the embodiment of FIG. 1.

Typically the width of PV modules 26 are similar, such as, for example about 800 mm or about 970-1000 mm. However, length varies considerably. To support longer length PV modules 26, ballast tiles 28 can be sized to adequately support the PV module 26 (as shown, e.g., in the embodiment of FIG. 3) or, alternatively, several ballast tiles 28a, 28b can be utilized to support a single PV module 26 (as shown, e.g., in the embodiment of FIG. 7), as would be understood by one with skill in the art. In the case of existing buildings, ballast tiles 28, 28a, 28b can be placed on top of existing roofing materials, and being self-ballasted, they require no roof penetrations, and no specialized labor, resulting in lower installation costs. This eliminates roof penetrations which are damaging to roof integrity and costly to seal.

The simple installation allows low cost unskilled labor to install the ballast tiles 28, 28a, 28b in the same time that would have been used for installing the building roof without such tiles. The pre-engineered design of the ballast tiles 28, 28a, 28b eliminates the need for engineering which is needed for conventional technologies such as steel structures. Therefore engineering and design costs as well as installation costs are reduced significantly with respect to conventional PV steel support structures, which require customized design and specialized installation. Ballast tiles 28, 28a, 28b can also be used for ground mounting, simply by laying the self-ballasted tiles on minimally prepared ground.

Once ballast tiles 28, 28a, 28b have been laid and roof construction is complete, PV modules 26 can be installed with minimal skilled labor. Installation consists of careful placement of the lower edge 38 of PV module 26 for laminates (i.e. glass PV modules with no aluminum frame) within the slots 36 of the lower mount members 30. The upper edge 42 of PV module 26 can then be lowered onto the upper mounting members 32 and connector means 40 can be operated to secure upper edge 42 of the PV module 26 to the upper mounting members 32. In this manner, PV module 26 can be slid into position and secured by one person, thus lowering installation costs. Rubber protective material can be used between connector means 40 and the glass of PV modules 26, and between the glass of PV modules 26 and concrete slots 36 of the lower mount members 30.

Figure 15:
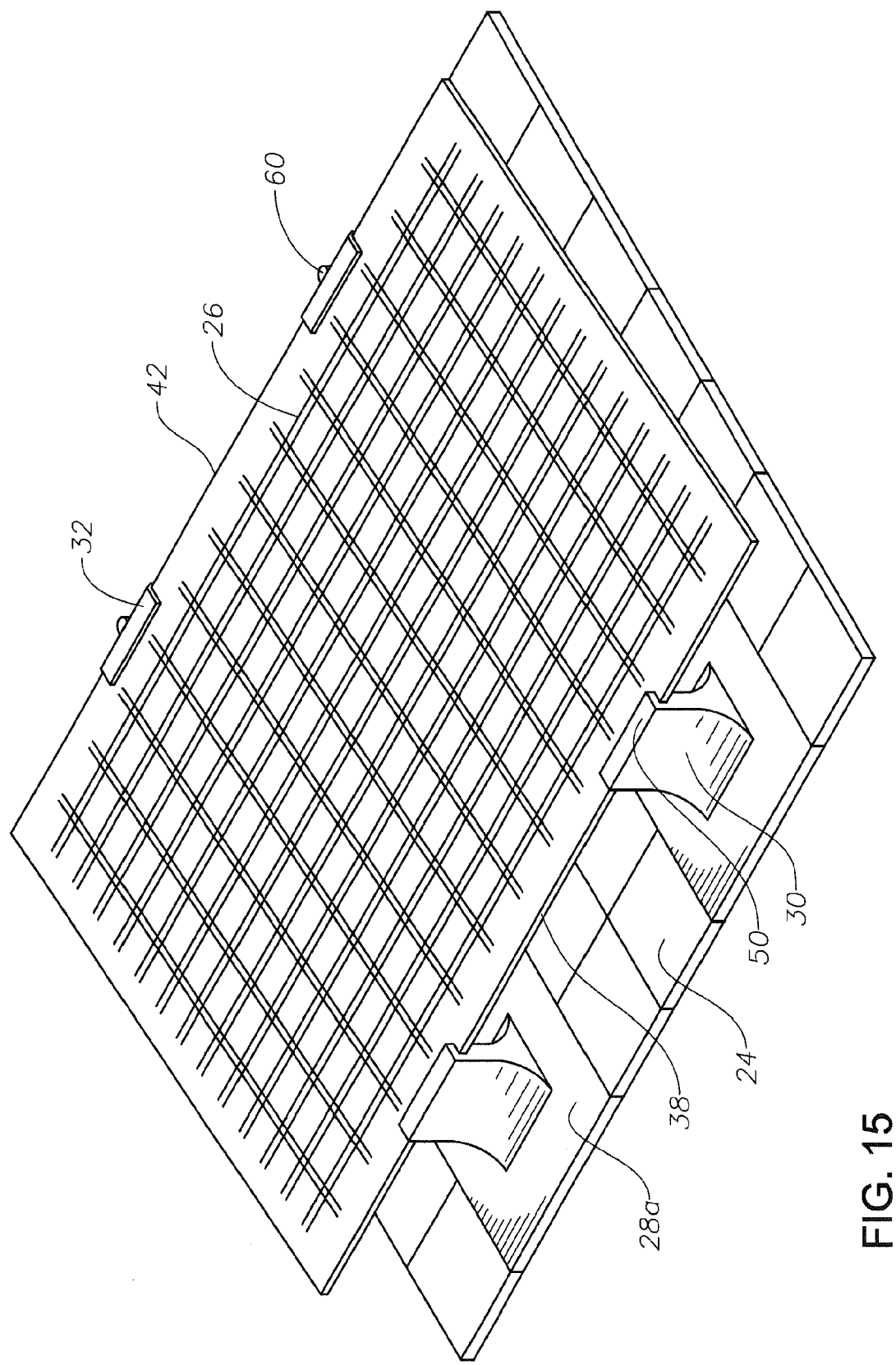
FIG. 15 is a perspective view of a framed PV module installed on mounting members according to the embodiment of FIG. 2.

In alternative embodiments of the present technology, and as shown in FIG. 15, for PV modules 26 with aluminum frames, suitable sized connector means 60 can be used to secure the module in place. When used with framed PV modules 26, connector means 60 can also include a fitting means. The fitting means can be, for example, a steel clamp with a twist type lockdown nut. Framed PV module 26 is useful for non-penetrating, commercial, or residential rooftop installations.

After physical installation of PV modules 26, wiring connections are completed between PV modules 26 in series or parallel and for connecting the PV modules 26 to a service panel. The wiring, such as cable 58 (shown in FIG. 10), can be safely run under PV modules 26 and, in embodiments having strut members 54, can be run through openings 56 in the strut members 54.

In lower latitude regions where flat roofing is common, summer electricity demand is highest. Therefore the highest economic value is gained by maximizing summer output of solar power modules. This can be achieved by having horizontal or nearly horizontal placement of PV modules 26. In some embodiments, the PV modules 26 can be positioned substantially horizontal. In alternative embodiments, the PV modules 26 are positioned with a minimum or low incidence angle to allow for ease of washing dust off the PV modules 26, thereby making it easier to keep the PV modules 26 clean and operating efficiently. Having a horizontal or low incidence angle of the PV modules 26 allows flexible north-south alignment since the impact of being off the exact north-south axis is minimized. This allows PV modules 26 to be placed generally along building axes without custom design of tiling to match north-south axes while maximizing roof coverage. Although flat roofs are a common location to mount PV modules 26, embodiments of the technology described herein can also be used for ground mounting, simply by laying the self-ballasted tiles on minimally prepared ground.

The technology described herein provides many advantages over known systems. For example, the system of the present technology provides an economical way to mount PV modules to flat roofs typical of commercial or residential buildings in lower latitude, high solar radiation regions, without the need for special installation tools or procedures. In addition, the technology herein described provides a PV module mounting system having PV modules that are installed with minimal incremental material costs. Furthermore, the system is adapted to mount PV modules at a low incidence angle that allows flexible north-south alignment, since the impact of being off the exact north-south axis is minimized. This allows the PV modules to be placed generally along building axes without custom design of tiling to match north-south axes. Because the PV modules can be placed in a horizontal or near horizontal position, the highest economic value is gained by maximizing electricity output.

The present technology described herein, therefore, is well adapted to carry out the objects and attain the ends and advantages mentioned, as well as others inherent therein. While presently preferred embodiments of the technology has been given for purposes of disclosure, numerous changes exist in the details of procedures for accomplishing the desired results. These and other similar modifications will readily suggest themselves to those skilled in the art, and are intended to be encompassed within the spirit of the present technology disclosed herein and the scope of the appended claims.

What is claimed is:

1. A ballast tile system for supporting photovoltaic modules, the system comprising:
at least one fiber-reinforced concrete ballast tile including:
a first mounting member extending upwardly from a top surface of the at least one ballast tile, the first mounting member configured to receive a lower end of a photovoltaic module;
a second mounting member extending upwardly from the top surface of the at least one ballast tile, the second mounting member configured to secure an upper edge of the photovoltaic module;
wherein the first mounting member has a horizontal slot arranged to receive the lower end of the photovoltaic module, and the horizontal slot is located at a first elevation on the first mounting member measured from the top surface of the at least one ballast tile;
the second mounting member secures the upper edge of the photovoltaic module with a connector located at a second elevation on the upper mounting member measured from the top surface of the at least one ballast tile: and
the second elevation is at least as high as the first elevation.

2. The ballast tile system of claim 1, wherein the first and second mounting members are integral to the at least one fiber-reinforced concrete ballast tile.

3. The system of claim 1, wherein the fiber reinforced concrete is selected from the group consisting of alkaline-resistant glass and polymer fiber.

4. The system of claim 1, wherein the height of the first elevation and the height of the second elevation are at least about 100 mm.

5. The system of claim 1, wherein the second mounting member is secured to the upper edge of the photovoltaic module using a connector selected from the group consisting of a bolt, and a threaded clamp with an adjustable opening.

6. The system of claim 1, wherein the first and second mounting members are operable to position the photovoltaic module substantially horizontal.

7. The system of claim 1, wherein the first and second mounting members are operable to position the photovoltaic module at a low incidence angle relative to a horizontal plane to ease the cleaning the of PV module.

8. The system of claim 1, wherein the at least one ballast tile is a plurality of ballast tiles, and further comprising a plurality of spacer tiles for positioning between the plurality of ballast tiles.

9. A system of ballast tiles for supporting photovoltaic modules integrated with a building roof, the system comprising:
a photovoltaic module;
a first fiber-reinforced concrete ballast tile including a first mounting member extending upwardly from a top surface thereof, the first mounting member configured to receive a lower end of the photovoltaic module;
a second fiber-reinforced concrete ballast tile including a second mounting member extending upwardly from the top surface thereof, the second mounting member configured to secure an upper edge of the photovoltaic module;

wherein the first mounting member has a horizontal slot arranged to receive the lower end of the photovoltaic module, and the horizontal slot is located at a first elevation on the first mounting member measured from the top surface of the at least one ballast tile;

the second mounting member secures the upper edge of the photovoltaic module with a connector located at a second elevation on the upper mounting member measured from the top surface of the at least one ballast tile; and the second elevation is at least as high as the first elevation.

10. The system of claim 9, wherein the first and second mounting members are integral to the first and second fiber-reinforced concrete ballast tiles, respectively.

11. The system according to claim 9, wherein the fiber reinforced concrete is selected from the group consisting of alkaline-resistant glass and polymer fiber.

12. The system according to claim 9, wherein the height of the first elevation and the height of the second elevation are at least about 100 mm.

13. The system according to claim 9, wherein the second mounting member is secured to the upper edge of the photovoltaic module using a connector selected from the group consisting of a bolt, and a threaded clamp with an adjustable opening.

14. The system according to claim 9, wherein the photovoltaic module includes an aluminum frame.

15. The system according to claim 9, wherein the photovoltaic module has a width of approximately about 800 mm.

16. The system according to claim 9, wherein the photovoltaic module has a width in the range of about 970 mm to about 1000 mm.

17. The system according to claim 9, wherein the building roof is flat roof.

18. A ballast tile system for supporting photovoltaic modules, the system comprising:

a photovoltaic module;

at least one fiber-reinforced concrete ballast tile including:

a first mounting member integral to and extending upwardly from a top surface of the at least one ballast tile, the first mounting member having a horizontal slot arranged to receive the lower end of the photovoltaic module, and the horizontal slot is located at a first elevation on the first mounting member measured from the top surface of the at least one ballast tile;

a second mounting member integral to and extending upwardly from the top surface of the at least one ballast tile, the second mounting member securing the upper edge of the photovoltaic module with a connector located at a second elevation on the upper mounting member measured from the top surface of the at least one ballast tile, wherein the second elevation is at least as high as the first elevation.

* * * * *